(12) United States Patent
Jang et al.

(10) Patent No.: US 8,928,832 B2
(45) Date of Patent: Jan. 6, 2015

(54) LIQUID CRYSTAL DISPLAY COMPRISING A MOLDING THAT IS INSERTED INTO A PLURALITY OF INSERTION HOLES OF A CHASSIS

(75) Inventors: Jin-Seok Jang, Yongin (KR); Seung-Mock Ro, Yongin (KR); Joo-Young Lee, Yongin (KR); Nam-Jin Jang, Yongin (KR); Won-Il Lee, Yongin (KR)

(73) Assignee: Samsung Display Co., Ltd. (KR)

( * ) Notice: Subject to any disclaimer, the term of this patent is extended or adjusted under 35 U.S.C. 154(b) by 110 days.

(21) Appl. No.: 13/114,918

(22) Filed: May 24, 2011

(65) Prior Publication Data
US 2012/0008061 A1    Jan. 12, 2012

(30) Foreign Application Priority Data
Jul. 8, 2010    (KR) .................. 10-2010-0065936

(51) Int. Cl.
*G02F 1/1333* (2006.01)
*G02F 1/1335* (2006.01)

(52) U.S. Cl.
CPC .............. *G02F 1/133308* (2013.01); *G02F 2001/133314* (2013.01); *G02F 2001/133325* (2013.01); *G02F 2201/46* (2013.01); *G02F 2201/465* (2013.01)
USPC .............................................. 349/58; 349/61

(58) Field of Classification Search
USPC ........................................ 349/58, 61–65, 70
See application file for complete search history.

(56) References Cited

U.S. PATENT DOCUMENTS

| 2005/0276076 A1* | 12/2005 | Shin .............................. 362/633 |
| 2008/0158473 A1* | 7/2008 | Liang .............................. 349/60 |
| 2008/0278653 A1* | 11/2008 | Chung et al. .................... 349/58 |

FOREIGN PATENT DOCUMENTS

| KR | 1020070001810 | * 1/2007 | ............ G02F 1/1333 |
| KR | 20070066116 | 6/2007 | |
| KR | 1020070079502 | 8/2007 | |
| KR | 20070103294 | 10/2007 | |
| KR | 10 0811363 | 2/2008 | |
| KR | 10-2008-0048870 | 6/2008 | |
| KR | 1020080101580 | 11/2008 | |
| KR | 10-2010-0052333 | 5/2010 | |

* cited by examiner

*Primary Examiner* — Paul Lee
(74) *Attorney, Agent, or Firm* — Knobbe Martens Olson & Bear LLP

(57) ABSTRACT

A liquid crystal display that can be slimly formed. The liquid crystal display may include: a liquid crystal display panel; a backlight unit including: a light source; and a light guide plate receiving light emitted from the light source and diffusing the received light; and a frame receiving the liquid crystal display panel and the backlight unit. The frame includes: a chassis including a bottom part and a side wall, the bottom part having insertion holes; and a molding that is combined with the chassis through the insertion holes. In addition, the bottom part of the chassis is formed with protrusions adjacent to the insertion holes and the protrusions protrude in a direction opposite to a direction in which the molding is combined with the insertion holes of the chassis.

13 Claims, 4 Drawing Sheets

LIQUID CRYSTAL DISPLAY COMPRISING A MOLDING THAT IS INSERTED INTO A PLURALITY OF INSERTION HOLES OF A CHASSIS

CROSS-REFERENCE TO RELATED APPLICATIONS

This application claims the benefit of Korean Patent Application No. 10 20100065936, filed Jul. 8, 2010, in the Korean Intellectual Property Office, the disclosure of which is incorporated herein by reference.

BACKGROUND

1. Field

Aspects of the present invention relate generally to a liquid crystal display and a fabrication method of the same, and more particularly, to a liquid crystal display that can be slimly formed and a fabricating method of the same.

2. Description of the Related Technology

A liquid crystal display (LCD) may replace existing cathode ray tube (CRT) display devices due to characteristics such as slimness, light weight, and low power consumption, among other characteristics. As a result, the LCD has been used for midsize and large products, such as a monitor and a television (TV), or the like as well as small-sized products such as a mobile phone, a personal digital assistant (PDA), and a portable multimedia player (PMP), or other similar portable electronic devices.

Generally, the LCD includes a liquid crystal display panel displaying image data using optical properties of a liquid crystal, a printed circuit board (PCB) having a driving circuit driving the liquid crystal display panel, a backlight unit including a light source to illuminate a screen, and a frame receiving the above noted components. In this case, the frame is formed by including a molding and a chassis to increase strength reinforcement. Demand for slim display devices has recently increased, and thus, there has been proposed a method of thinly forming a side thickness of the frame into which the liquid crystal display panel is inserted in order to make the LCD slim.

As described above, since a thickness of the molding and chassis of the frame should be thin according to the slimness of the LCD, a strength of the frame may be deteriorated and the liquid crystal display panel disposed in the frame may be vulnerable to external impact, or other damage to the frame. In addition, a space combining the molding with the chassis is insufficient such that they are not firmly combined with each other. Therefore, the molding and the chassis can be easily separated from each other by the external impact.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

Aspects of the present invention provide a liquid crystal display having an advantage of securing structural stability by preventing deterioration in strength of the liquid crystal display. In addition, aspects of the present invention provide a method of manufacturing a liquid crystal display to prevent deterioration in strength while being slimly fabricated.

Aspects of the present invention provide a liquid crystal display, including: a liquid crystal display panel; a backlight unit including: a light source; and a light guide plate receiving light emitted from the light source and diffusing the received light; and a frame receiving the liquid crystal display panel and the backlight unit. The frame includes: a chassis including a bottom part and a side wall, the bottom part having insertion holes; and a molding that is combined with the chassis through the insertion holes. The bottom part of the chassis is formed with protrusions adjacent to the insertion holes and the protrusions protrude in a direction opposite to a direction in which the molding is combined with the insertion holes of the chassis.

According to another aspect of the present invention, the protrusions may be formed to cover at least a part of the insertion holes when the insertion holes are viewed from a direction where the molding is inserted into the insertion holes.

According to another aspect of the present invention, more than one of the protrusions may be formed to correspond to one of the insertion holes.

According to another aspect of the present invention, each of the protrusions may include a supporting portion connected to inner surfaces of the insertion holes and protrusion portions connected to the supporting portion and spaced apart from the insertion holes.

According to another aspect of the present invention, the supporting portion may be formed in plural.

According to another aspect of the present invention, the insertion holes and the protrusions may be each formed in plural and are symmetrical to each other with respect to a center of the bottom part of the chassis.

According to another aspect of the present invention, the chassis and the molding may be integrally formed with each other to be one body.

According to another aspect of the present invention, the chassis and the molding may be integrally formed with each other by injection molding.

According to another aspect of the present invention, the chassis may include any one of steel use stainless (SUS), iron, chromium, and nickel.

According to another aspect of the present invention, the molding may include polycarbonate (PC).

According to another aspect of the present invention, the liquid crystal display panel may contact the side wall of the chassis to be received in the frame.

According to another aspect of the present invention, the liquid crystal display panel may contact the side wall of the molding to be received in the frame.

According to another aspect of the present invention, the liquid crystal display may further include an optical sheet formed between the liquid crystal display panel and the backlight unit.

According to another aspect of the present invention, the liquid crystal display may further include a reflecting sheet formed at the lower part of the backlight unit.

Aspects of the present invention provide a method for fabricating a liquid crystal display, the method including: forming a chassis including a side wall and a bottom part, the bottom part having insertion holes and protrusions adjacent to the insertion holes; forming a molding by flowing an injection molding material into the insertion holes of the chassis and hardening the injection molding material; disposing a light source and a light guide plate in a frame in which the chassis is integrally formed with the molding, the light guide plate receiving and diffusing light emitted from the light source; and receiving the liquid crystal display panel in the frame.

According to another aspect of the present invention, the protrusions may be formed to cover at least a part of respective ones of the insertion holes when the insertion holes are viewed in a direction in which an injection molding material is inserted into the insertion holes.

According to another aspect of the present invention, more than one of the protrusions may be formed to correspond to one of the insertion holes.

According to another aspect of the present invention, the insertion holes and the protrusions may be each formed in plural and are formed to be symmetrical to each other with respect to a center of the bottom part of the chassis.

According to another aspect of the present invention, the chassis may include any one of steel use stainless (SUS), iron, chromium, and nickel.

According to another aspect of the present invention, the injection molding material may include polycarbonate.

According to another aspect of the present invention, the LCD can be slim. In addition, according to another aspect of the present invention, the molding and the chassis forming the frame of the liquid crystal display (LCD) can be firmly combined. In addition, according to another aspect of the present invention, the structural stability of the LCD can be secured by suppressing the deterioration in strength of the LCD.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Figure 1:
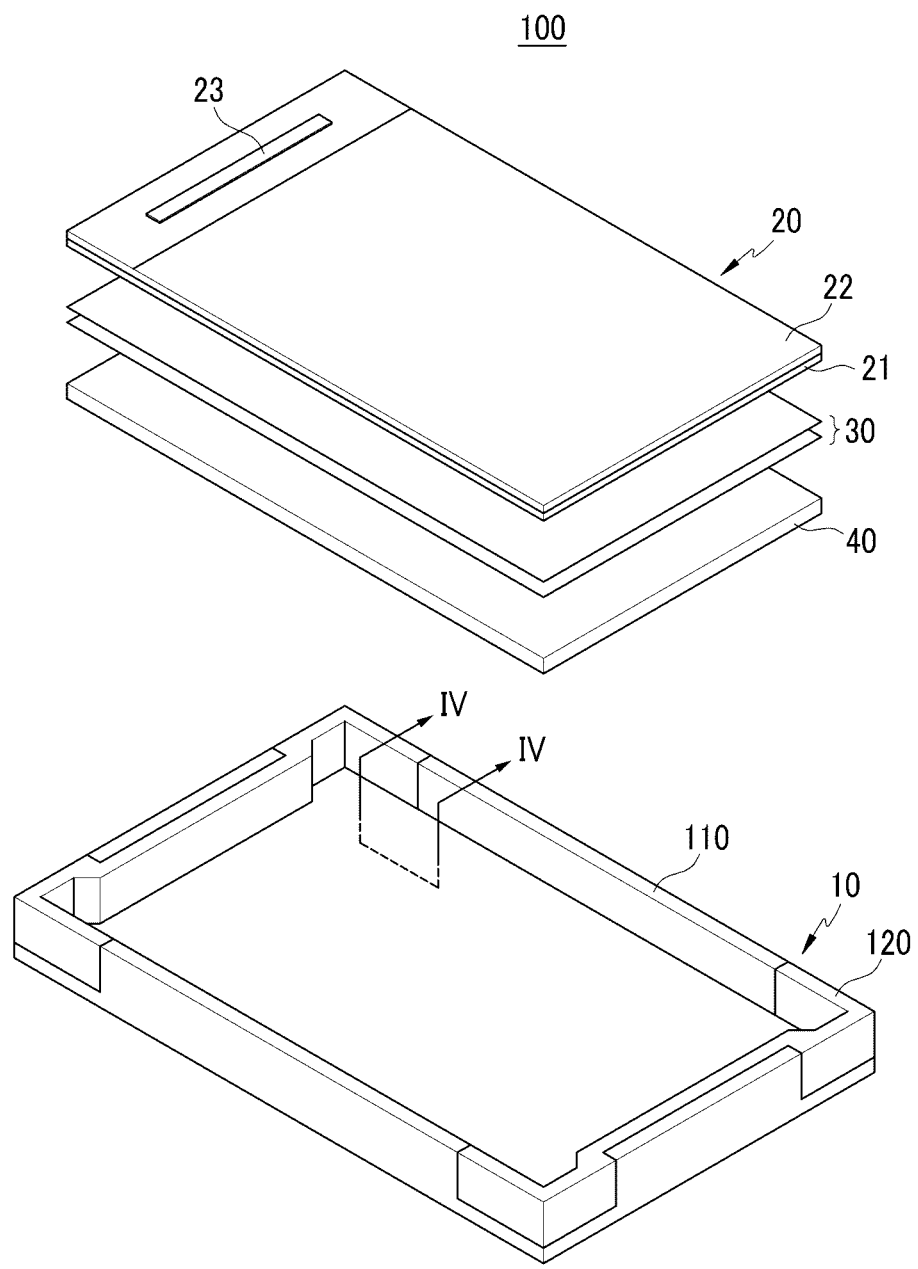
FIG. 1 is a schematic exploded perspective view of an LCD according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic exploded perspective view of an LCD according to an embodiment. Referring to FIG. 1, a liquid crystal display (LCD) 100, according to the present embodiment, includes a liquid crystal display panel 20, a backlight unit, and a frame 10 receiving the LCD panel 20, the backlight unit, and the frame 10.

The liquid crystal display panel 20 includes a thin film transistor (TFT) substrate 21 and a color filter substrate 22 that are disposed to oppose each other and a liquid crystal (not shown) is injected between these substrates 21 and 22. In this case, the thin film transistor substrate 21 and the color filter substrate 22 are made of a material such as glass, or other similarly suitable materials.

The thin film transistor substrate 21 is provided with a thin film transistor, a capacitor, and a pixel electrode. Also the thin film transistor substrate 21 includes a gate electrode and a source electrode of the thin film transistor that are respectively connected to a gate line and a data line and a drain electrode of the thin film transistor is connected to the pixel electrode. The gate line and the data line of the thin film transistor substrate 21 are connected to a printed circuit board (PCB) (not shown) to input electrical signals to the PCB, thereby inputting the electrical signals to the gate electrode and the source electrode of the thin film transistor. The thin film transistor is turned-on or turned-off according to the input electrical signals in order to output electrical signals to the drain electrode in order to drive the liquid crystal.

The color filter substrate 22 has a color filter formed with an RGB pixel and a common electrode formed of a transparent electrode such as indium tin oxide (ITO), or other suitable materials. When the gate electrode and the source electrode of the thin film transistor are applied with power to turn-on the thin film transistor, an electric field is formed between the pixel electrode of the thin film transistor substrate 21 and the common electrode of the color filter substrate 22. An alignment angle of the liquid crystal injected between the thin film transistor substrate 21 and the color filter substrate 22 is changed by the electric field and light transmittance is changed according to the changed alignment angle, thereby making it possible to transmit light from a desired pixel.

An integrated circuit chip 23, which is mounted on the thin film transistor substrate 21, controls the liquid crystal display panel 20. The integrated circuit chip 23 generates a plurality of timing signals which are used in applying gate driving signals and data driving signals at a proper time. The timing signals are respectively applied to the gate line and the data line of the liquid crystal display panel 20. Although not required in all aspects of the present invention, in order to polarize light passing through the liquid crystal display panel 20, polarizing plates may be further attached to opposing surfaces of the liquid crystal display panel 20.

The backlight unit is disposed at a lower part of the liquid crystal display panel 20. The backlight unit includes a light source (not shown) and a light guide plate 40 in which light emitted from the light source is input and diffused. A light emitting diode (LED) may be used as the light source, and the LED may be mounted on a printed circuit layer (not shown) to be disposed on one side of the light guide plate 40. Meanwhile, a number of light sources used can be variously changed according to a size and usage of the liquid crystal display 100. Although not required in all aspects of the present invention, the light source may be disposed at the lower part of the light guide plate 40 in some cases. Light emitted from the light source is incident into the light guide plate 40 and the light guide plate 40 guides the input light to uniformly diffuse light over the light guide plate 40.

An optical sheet 30 is formed between the liquid crystal display panel 20 and the backlight unit (not shown). The optical sheet 30 may include a diffusion sheet, a prism sheet, a protective sheet, or other similar sheets. Light passing through the light guide plate 40 is incident on the liquid crystal display panel 20 in a direction orthogonal to a planar surface of the liquid crystal display panel 20. In addition, although not required in all aspects of the present invention, a reflecting sheet (not shown) may be further provided at the lower part of the backlight unit. When the reflecting sheet (not shown) is formed, light emitted towards the lower surface of the light guide plate 40 is reflected from the optical sheet, thereby making it possible to minimize the loss of light. However, aspects of the present invention are not limited to a configuration of the liquid crystal display panel 20 and the backlight unit as described above, and the configuration can be changed into various configurations known by a person of an ordinary skill in the art.

The liquid crystal display panel 20 and the backlight unit, etc., are disposed in the frame 10. The frame 10 includes a chassis 110 and a molding 120, wherein the chassis 110 includes a bottom part 111 and a side wall 112. The chassis 110 is made of steel use stainless (SUS), iron, chromium, nickel, or an other suitable material, in order to maintain an entire shape of the frame 10 and supplement the strength of the frame 10, thereby protecting the liquid crystal display panel 20, or other similar elements of the LCD 100. In addition, the molding 120 is made of a material that has a relatively lighter and larger elasticity than the materials of the chassis 110. For example, the molding 120 may be made of a buffering material such as polycarbonate (PC) and is integrally formed with the chassis 110 by the injection molding, or another similar process.

As described above, in order to make the LCD 100 slim, a thickness of both surfaces of the frame 10 is thinly formed. Therefore, in the present embodiment, the molding 120 is not formed on both sides of the frame 10 and the molding 120 is formed to expose a side wall 112 of the chassis 110. Therefore, the liquid crystal display panel 20, and other similar items, may be received in the frame 10 by contacting the side wall 112 of the chassis 110. However, the shape of frame 10, according to aspects of the present invention, is not limited to the shape shown in FIG. 1 and the molding 120 may be formed into the side wall 112 of the chassis 110 formed on both sides of the frame 10 at a thin thickness. According to the abovementioned configuration, the liquid crystal display panel 20, or other similar items, may contact the molding 120 to be received in the frame 10.

Figure 2:
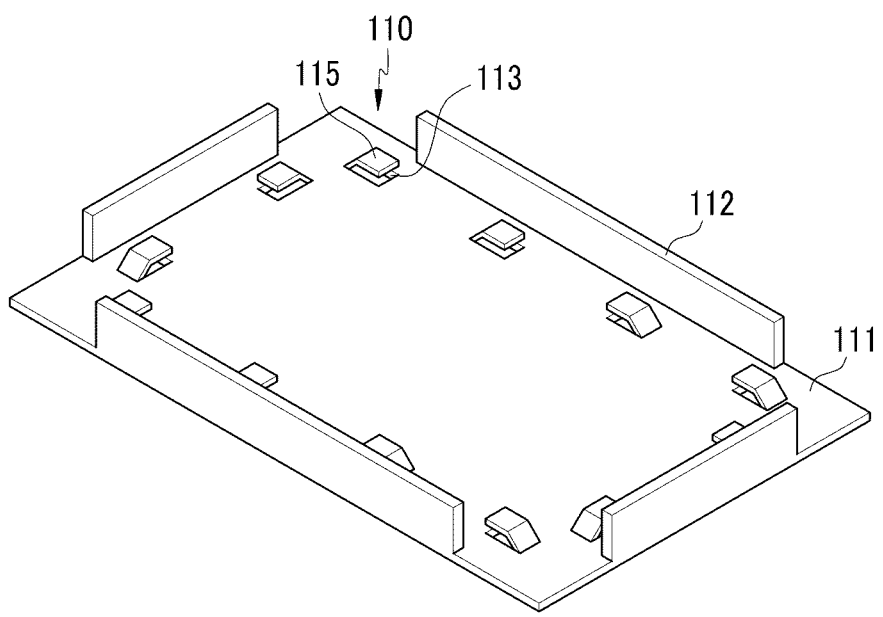
FIG. 2 is a perspective view of a chassis of the LCD according to the embodiment of FIG. 1.

FIG. 2 is a perspective view of the chassis 110 of the frame 10 of the LCD 100 according to the embodiment of FIG. 1. The configuration of the chassis 110 according to the present embodiment will be described with reference to FIG. 2. The chassis 110 includes a bottom part 111 and a side wall 112. The side wall 112 is formed to extend in a vertical direction with respect to an edge of the bottom part 111. In addition, the bottom part 111 is provided with an insertion hole 113 and a protrusion 115 is formed to be adjacent to the insertion hole 113.

The insertion hole 113 and the corresponding protrusion 115 are disposed to be symmetrical to each other based on the bottom part 111 of the chassis 110. Although the present embodiment describes, by way of example, a case where the insertion hole 113 is formed in plural along the side of the bottom part 111, aspects of the present invention are not limited thereto and the insertion hole 113 may be formed singularly, and the number of insertion holes 113 and protrusions 115 may be variously set according to the size and usage of the liquid crystal display (LCD) 100.

Although not required in all aspects of the present invention, in the present embodiment, the chassis 110 and the molding 120 are integrally formed with each other, or in other words, formed to be one body or unit. The process of integrally forming the chassis 110 and the molding 120 may be performed by the injection molding, or other similar processes. The process of integrally forming the chassis and the molding 120 will be described below.

Meanwhile, a strength of a portion where the insertion hole 113 is formed is deteriorated as compared to other portions. In particular, even when the insertion hole 113 is formed at the side wall 112 of the chassis 110, the strength may be remarkably deteriorated. Therefore, in the present embodiment, the insertion hole 113 combining the chassis 110 with the molding 120 is formed on the bottom part 111 rather than the side wall 112 of the chassis 110.

As such, the chassis 110 and the molding 120 are combined with each other in such a manner that the insertion hole 113 is formed on the bottom part 111 of the chassis 110 and the molding 120 is inserted into this portion having the insertion hole 113. After the chassis 110 and the molding 120 are integrally formed with each other by the combination, when an external force is applied to the vertical direction of the bottom part 111, that is, a direction opposite of a direction in which the molding 120 is inserted into the insertion hole 113, the molding 120 can easily be separated from the insertion hole 113, thereby making it possible to separate the chassis 110 from the molding 120. Therefore, in the present embodiment, the protrusion 115 is formed to be adjacent to the insertion hole 113 of the chassis 110, such that the chassis 110 is firmly combined with the molding 120 at the time of integrally forming the chassis 110 and the molding 120.

Figure 3:
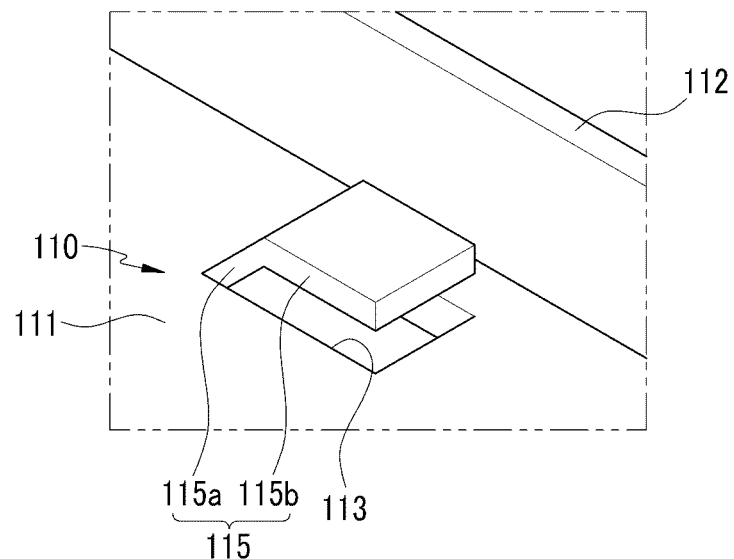
FIG. 3 is a partial enlarged view of protruding parts of the chassis of the LCD according to the embodiment of FIG. 1.
Figure 4:
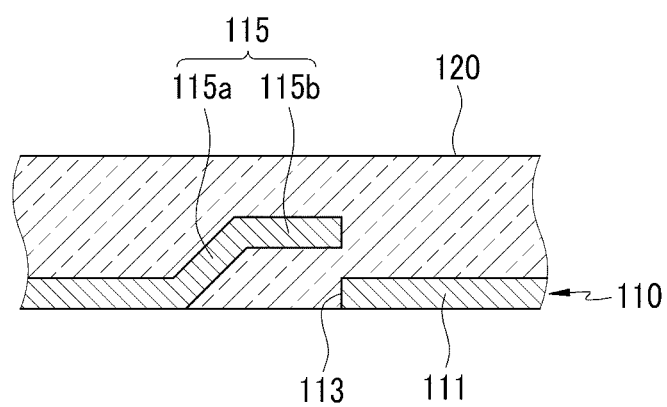
FIG. 4 is a partial cross-sectional view taken along line IV-IV of FIG. 1 the LCD according to the embodiment of FIG. 1.

FIG. 3 is an enlarged view of a portion of the protrusion 115 according to the embodiment of FIG. 1. FIG. 4 is a cross-sectional view taken along line IV-IV of the LCD 100 of FIG. 1. A configuration of the chassis 110 according to the present embodiment will be described in detail. The protrusion 115 of the chassis 110 is formed to extend from one inner surface of the insertion hole 113. The protrusion 115 includes a supporting portion 115*a* extending from the one inner surface of the insertion hole 113. The protrusion 115 also includes a protruding portion 115*b* connected to the supporting portion 115*a* and formed to be spaced apart from the insertion hole 113.

In order to prevent the molding 120 from separating from the chassis 110 by the external force after the molding 120 is integrally formed with the chassis 110, the protrusion 115 should be formed to cover at least a part of the insertion hole 113 when viewing the insertion hole 113 in the direction in which the molding 120 is inserted into the insertion hole 113. Therefore, in the present embodiment, the protruding portion 115*b* of the protrusion 115 is formed to cover the insertion hole 113. Although not required in all aspects of the present invention, the protruding portion 115*b* may be formed to cover an entire surface of the insertion hole 113.

Referring to FIG. 4, in the frame 10 according to the embodiment of FIG. 1, the chassis 110 is integrally formed with the molding 120. The chassis 110 and the molding 120 are combined in the form in which the molding 120 is inserted into the insertion hole 113. In this case, the molding 120 is inserted into the insertion hole 113 positioned at a lower part of the protruding portion 115*b* of the protrusion 115. Thus, the chassis 110 is firmly combined with the molding 120. In other words, in the protrusion 115 formed to be adjacent to the insertion hole 113, the protruding portion 115*b* is formed to cover at least a part of the insertion hole 113 while it is spaced apart from the insertion hole 113. Thus, the protrusion 115 can suppress a separation of the molding 120 even though the external force is applied to the bottom part 111 of the chassis 110 in a vertical direction.

Meanwhile, when the insertion hole 113 and the corresponding protrusion 115 are formed in plural, a direction where the protrusion 115 is formed may not match each insertion hole 113. This configuration can efficiently suppress a separation of the molding 120. However, a direction in which the supporting portion 115a of the protrusion 115 extends may be formed in consideration of a simplification and efficiency of the process of forming the protrusion 115.

As such, according to the present configuration of the protrusion 115 according to the present embodiment, the chassis 110 and the molding 120 can be firmly combined with each other in the frame 10. In addition, as described above, a strength of a portion of the bottom part 111 where the insertion hole 113 is formed is deteriorated as compared to that of other portions of the bottom part 111. In the present embodiment, the protrusion 115 extending from the inner surface of the insertion hole 113 is formed, thereby making it possible to improve the strength around the insertion hole 113.

Hereinafter, a fabricating method of a liquid crystal display LCD according to the embodiment of FIG. 1 will be described with reference to FIGS. 1 to 4.

In order to fabricate the LCD according to the present embodiment, the insertion hole 113 and the chassis 110 including the bottom part 111 are formed. The bottom part 11 is formed to include the protrusion 115 formed adjacent to the insertion hole 113 and the side wall 112 of the chassis 110. Thereafter, the molding 120 is formed by flowing an injection molding material into the insertion hole 113 of the chassis 110 and then hardening the injection molding material. In other words, the injection molding material flows into the lower space of the protruding portion 115b of the protrusion 115 and is then hardened to form the molding 120 and the chassis 110. Additionally, although not required in all aspect of the present invention, the chassis 110 may be integrally formed with the molding 120 by the process to form the molding 120.

In the present embodiment, the protrusion 115 is formed to cover at least a part of the insertion hole 113 when the insertion hole 113 is viewed from the direction wherein the injection molding material is inserted into the insertion hole 113. The frame 10 is formed in this manner, such that after the chassis 110 is integrally formed with the molding 120, a defect such as a separation of the molding 120 due to the external force can be suppressed.

The insertion hole 113 and the protrusion 115 are formed in plural and are formed to be symmetrical to each other with respect to a center of the bottom part 111. However, aspects of the present invention are not limited thereto and the insertion hole 113 and the protrusion 115 may each be formed one by one and even in the case where they are formed in plural, they may be formed to not be symmetrical to each other.

As such, after the frame 10 is formed by integrally forming the chassis 110 and the molding 120, the light source and the light guide plate 40 are received in the frame 10 and the liquid crystal display panel 20 is received therein, thereby making it possible to fabricate the LCD 100. In this configuration, the optical sheet 30 is further provided between the liquid crystal display panel 20 and the light guide plate 40 and the reflecting sheet (not shown) is further provided at the lower part of the light guide plate 40.

Figure 5:
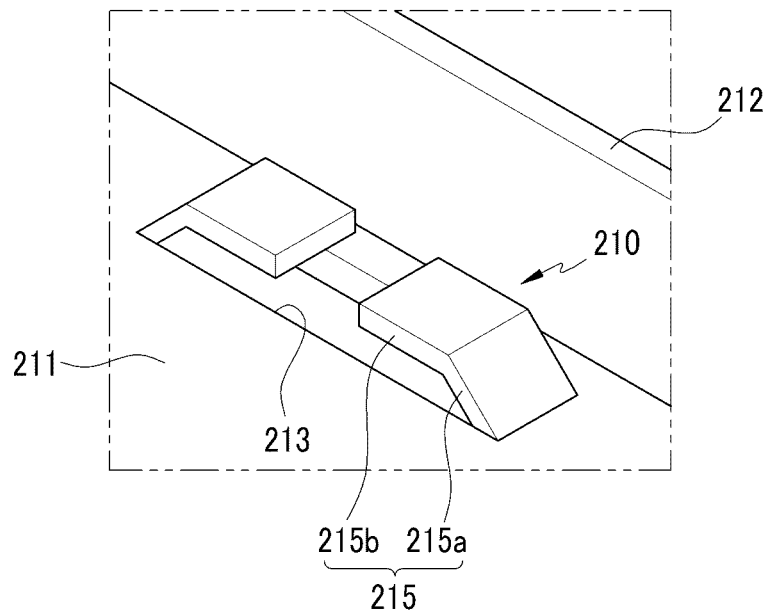
FIG. 5 is a partial enlarged view of protruding parts of a chassis of an LCD according to another embodiment of the present invention.

Meanwhile, a shape of a protrusion 215 formed at a chassis 210 can be variously changed. Hereinafter, various examples of the shape of the protrusion 215 will be described with reference to FIGS. 5 and 6. FIG. 5 is an enlarged view of the protrusion 215 portion of the chassis 210 of an LCD according to an embodiment of the present invention.

Referring to FIG. 5, the insertion hole 213 is formed in a bottom part 211 of the chassis 210 and two protrusions 215 are both formed in the insertion hole 213. The two protrusions 215 each include a supporting portion 215a and a protruding portion 215b. Each supporting portion 215a respectively extends from one of a pair of opposing inner surfaces of the insertion hole 213 and each protruding portion 215b are connected to a respective supporting portion 215a and are formed to be spaced apart from the insertion hole 213.

In the present embodiment, each protruding portion 215b is formed to cover at least a part of the insertion hole 213 when the insertion hole 213 is viewed from the direction in which molding is inserted into the insertion hole 213. When the molding is formed by the injection molding, the molding flows into the lower space of the protruding portion 215b of the protrusion 215 and is then hardened to be integrally formed with the chassis 210. According to the abovementioned configuration, even though the external force is applied to the bottom part 211 of the chassis 210 in a vertical direction, the protrusion 215 can efficiently suppress the separation of the molding 120. In addition, a strength around the insertion hole 213 can be improved.

Figure 6:
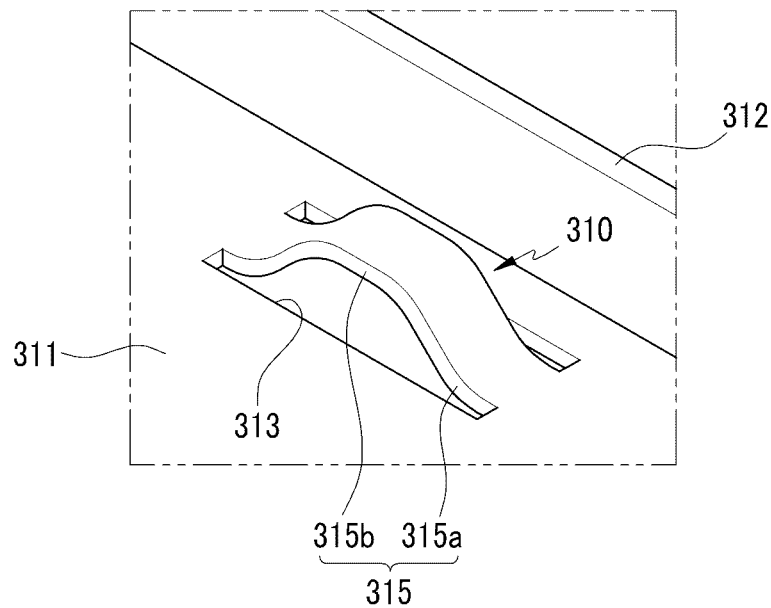
FIG. 6 is a partial enlarged view of protruding parts of a chassis of an LCD according to another embodiment of the present invention.

FIG. 6 is an enlarged view of a protrusion 315 of a chassis 310 according to another exemplary embodiment.

Referring to FIG. 6, an insertion hole 313 inserted with a part of the molding 120 to be combined therewith and the protrusion 315 corresponding to the insertion hole 313 are formed in a bottom part 311 of the chassis 310. The protrusion 315 includes two supporting portions 315a and the protruding portion 315b, wherein the two supporting portions 315a extend from respective opposing inner surfaces of the insertion hole 313. The protruding portion 315b is connected to the two supporting portions 315a and formed to be spaced apart from the insertion hole 313.

In the present embodiment, the protruding portion 315b is formed to cover most of the insertion hole 313 when the insertion hole 313 is viewed from a direction in which the molding is inserted into the insertion hole 313. When the molding 120 is formed by the injection molding, the molding flows into the lower space of the protruding portion 315b of the protrusion 315 and is then hardened so as to be integrally formed with the chassis 310. According to aspects of the present invention, even though the external force is applied to the bottom part 311 of the chassis 310 in a vertical direction, the protrusion 315 can efficiently suppress the separation of the molding 120. In addition, a strength around the insertion hole 313 can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A liquid crystal display, comprising:
 a liquid crystal display panel;
 a backlight unit comprising:
  a light source; and
  a light guide plate receiving light emitted from the light source and diffusing the received light; and
 a frame receiving the liquid crystal display panel and the backlight unit, the frame including:
  a chassis including four side walls without insertion holes and a bottom part having insertion holes; and
  a molding that is combined with the chassis through the insertion holes,
 wherein the bottom part of the chassis is formed with protrusions adjacent to the insertion holes,
 wherein the protrusions protrude in a direction opposite to a direction in which the molding is combined with the insertion holes of the chassis, and wherein the protrusions are formed to cover at least a part of the insertion holes and the molding when viewed from a direction where the molding is inserted into the insertion holes, such that a portion of the molding is inserted between the protrusions and the insertion holes.

2. The liquid crystal display of claim 1, wherein more than one of the protrusions are formed to correspond to one of the insertion holes.

3. The liquid crystal display of claim 1, wherein each of the protrusions comprises:
   a supporting portion connected to inner surfaces of the insertion holes; and
   protrusion portions connected to the supporting portion and spaced apart from the insertion holes.

4. The liquid crystal display of claim 3, wherein the supporting portion is formed in plural.

5. The liquid crystal display of claim 1, wherein the insertion holes and the protrusions are each formed in plural and are symmetrical to each other with respect to a center of the bottom part of the chassis.

6. The liquid crystal display of claim 1, wherein the chassis and the molding are integrally formed with each other to be one body.

7. The liquid crystal display of claim 6, wherein the chassis and the molding are integrally formed with each other by injection molding.

8. The liquid crystal display of claim 1, wherein the chassis includes any one of steel use stainless (SUS), iron, chromium, and nickel.

9. The liquid crystal display of claim 1, wherein the molding includes polycarbonate (PC).

10. The liquid crystal display of claim 1, wherein the liquid crystal display panel contacts the side wall of the chassis to be received in the frame.

11. The liquid crystal display of claim 1, wherein the liquid crystal display panel contacts a side wall of the molding to be received in the frame.

12. The liquid crystal display of claim 1, further comprising an optical sheet formed between the liquid crystal display panel and the backlight unit.

13. The liquid crystal display of claim 1, further comprising a reflecting sheet formed at the lower part of the backlight unit.

\* \* \* \* \*